United States Patent
Awakura

(10) Patent No.: US 7,329,825 B2
(45) Date of Patent: Feb. 12, 2008

(54) ELECTRIC DISCHARGE MACHINE AND MACHINING METHOD THEREFOR

(75) Inventor: Yuichi Awakura, Kanagawa (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 179 days.

(21) Appl. No.: 10/523,052

(22) PCT Filed: Jun. 3, 2004

(86) PCT No.: PCT/JP2004/008062

§ 371 (c)(1),
(2), (4) Date: Feb. 2, 2005

(87) PCT Pub. No.: WO2004/108336

PCT Pub. Date: Dec. 16, 2004

(65) Prior Publication Data

US 2006/0054598 A1    Mar. 16, 2006

(30) Foreign Application Priority Data

Jun. 4, 2003    (JP)    ............... 2003-159598

(51) Int. Cl.
*B23H 1/04*    (2006.01)
*B23H 7/26*    (2006.01)

(52) U.S. Cl. .................................. 219/69.15
(58) Field of Classification Search ............ 219/69.11, 219/69.15, 69.17, 69.2, 69.14
See application file for complete search history.

(56) References Cited

U.S. PATENT DOCUMENTS

| | | | | |
|---|---|---|---|---|
| 5,945,009 A * | 8/1999 | Beck et al. | ............... | 219/69.11 |
| 6,127,642 A * | 10/2000 | Gleason et al. | ........... | 219/69.15 |
| 6,211,480 B1 * | 4/2001 | Nagata | ..................... | 219/69.17 |
| 6,396,022 B1 * | 5/2002 | Suzuki | ..................... | 219/69.15 |
| 6,717,094 B2 * | 4/2004 | Beaumont | ................. | 219/69.15 |
| 2003/0192861 A1* | 10/2003 | Lin | ......................... | 219/69.15 |
| 2005/0077269 A1* | 4/2005 | Yokomichi | ............... | 219/69.15 |

FOREIGN PATENT DOCUMENTS

| JP | 60-161036 | | 8/1985 |
|---|---|---|---|
| JP | 60 161036 A | | 8/1985 |
| JP | 61-109640 A | * | 5/1986 |
| JP | 5-329714 A | * | 12/1993 |
| JP | 7-24649 A | * | 1/1995 |
| JP | 8-229747 A | * | 9/1996 |
| JP | 08 229747 A | | 9/1996 |

(Continued)

*Primary Examiner*—Geoffrey S. Evans
(74) *Attorney, Agent, or Firm*—Paul & Paul

(57) ABSTRACT

An electric discharge machine and method for carrying out electric discharge machining there within is provided, wherein after an electrode (21) and an electrode guide holder (25) are attached to an electrode holder (23), in advance, which is in turn mounted on a spindle (13), the electrode guide holder (25) is gripped by a gripper arm (29) and moved to a distal end of the electrode (21) so that the machining is carried out while the distal end of the electrode (21) is supported by an electrode guide (61). When the electrode (21) must be replaced due to the exhaustion thereof during the electric discharge machining of a fine hole, the electric discharge machine and method make it possible to assuredly carry out the replacement of the electrode in a short time.

11 Claims, 6 Drawing Sheets

FOREIGN PATENT DOCUMENTS

| | | | |
|---|---|---|---|
| JP | 8-290332 A | * | 11/1996 |
| JP | 2952339 | | 7/1999 |
| JP | 2000-33522 A | * | 2/2000 |
| JP | 2001 287119 A | | 10/2001 |
| JP | 2002-301623 A | * | 10/2002 |

* cited by examiner

ELECTRIC DISCHARGE MACHINE AND MACHINING METHOD THEREFOR

TECHNICAL FIELD

The present invention relates to an electric discharge machine, to an electric discharge machining method and, particularly to an electric discharge machine and an electric discharge machining method suitable for a case in which a thin rod-like or pipe-like electrode is used for machining a fine hole in a workpiece.

BACKGROUND ART

When a fine hole is formed in a workpiece by electric discharge machining, a rod-like or pipe-like electrode is used to apply a voltage between the electrode and the workpiece so that the workpiece is machined by electric discharge generated between them. As the electrode is liable to be easily exhausted when used for machining the fine hole, the used rod-like or pipe-like electrode is generally long. The thin and long electrode is liable to vibrate or flex during the electric discharge machining, which might reduce the machining accuracy. An electric discharge machine in which an electrode guiding device for supporting and guiding the electrode is employed to prevent the vibration or flexion from occurring is disclosed in Japanese Patent No. 2,952,339. In the technology described in this Japanese Patent No. 2,952,339, a fine hole machining electrode is used, and an electrode guiding device for supporting and guiding the fine hole machining electrode and an electrode-induction device for inserting the electrode into the electrode guiding device are provided. The electrode is inserted into a guide hole of the electrode guiding device while being nipped by the electrode-induction device, and a fine hole is formed by electric discharge machining while guiding the electrode by the electrode guiding device. Further, a method and an apparatus are disclosed in the U.S. Pat. No. 6,396,022, in which an electrode magazine including an electrode guide having a pipe electrode inserted therein is replaced in a spindle.

The prior art described in the above-mentioned Japanese Patent No. 2,952,339 is problematic in that the electrode-induction device is required for inserting the electrode mounted on the spindle into the electrode guiding device and in that a process for inserting the electrode into an inner hole of the electrode guide is troublesome and time-consuming because the thin and long electrode is liable to vibrate and/or flex. Also, the prior disclosed in the U.S. Pat. No. 6,396,022 is a system in which a plurality of large electrode magazines, each including a pipe-like electrode, a collet chuck for holding and guiding the pipe-like electrode and means for moving a vibration preventing guide and an electrode guide, are accommodated in advance in a magazine rack so that the electrode magazine is replaceable in the spindle, which is problematic in that a structure thereof is complicated.

DISCLOSURE OF THE INVENTION

The present invention has been made to solve the above-mentioned problems in the prior art. An object of the present invention is to provide an electric discharge machine and an electric discharge machining method, which can eliminate a complicated process of inserting an electrode into an inner hole of an electrode guide every time when the electrode is exhausted due to the electric discharge machining and replaced with new one, whereby the replacement of the electrode and/or the electrode holder can be easily and assuredly carried out in a short time, and electric discharge machining including multiple processes can continue for a long period in an unattended operation, resulting in an improved efficiency of the electric discharge machining.

To achieve the above-mentioned object, according to a first aspect of the present invention, there is provided an electric discharge machine for machining a workpiece in a desirable manner by applying electric discharge machining voltage between an electrode and the workpiece while feeding the electrode and the workpiece relative to each other to control a machining gap, which includes a spindle provided with attachment means for detachably attaching an electrode holder to the spindle, the electrode holder having an engagement portion for engaging with the attachment means of the spindle and provided with electrode holding means for holding the electrode in the electrode holder, an electrode guide holder including an engagement portion for engaging with the electrode holder and having attached thereto an electrode guide for supporting and guiding the electrode, and electrode guide holder supporting means for supporting the electrode guide holder so that the electrode guide supports a distal end of the electrode, said electrode guide holder supporting means having gripping means for gripping the electrode guide holder and provided with moving means for moving the electrode guide holder in parallel to an axis of the spindle.

In the machine according to the present invention, as described above, the electrode is held in advance, in the electrode holder on which the electrode guide holder is then mounted, so that the electrode is inserted into the inner hole of the electrode guide attached to the electrode guide holder, and after the electrode holder is mounted on the spindle, the electrode guide holder is moved to the distal end of the electrode by the electrode guide holder supporting means so that the electric discharge machining is carried out while the distal end of the electrode being supported by the electrode guide. The spindle and a table are adapted to be movable relative to each other. Such a construction can eliminate a troublesome process of inserting the electrode into the inner hole of the electrode guide every time the electrode is exhausted due to the electric discharge machining and the electrode holder is replaced, whereby it is possible to assuredly and extremely easily carry out the replacement of the electrode holder in a short time. The electrode holder having the electrode attached thereto may be manually mounted on the spindle or may be mounted on the spindle by electrode holder replacement means.

According to a second aspect of the present invention, there is provided an electric discharge machine for machining a workpiece in a desirable manner by applying electric discharge machining voltage between an electrode and the workpiece while feeding the electrode and the workpiece relative to each other to control a machining gap, which includes a spindle provided with attachment means for detachably attaching the electrode or an electrode holder to the spindle, the electrode holder having an engagement portion for engaging with the attachment means of the spindle and provided with electrode holding means for holding the electrode in the electrode holder, an electrode guide for supporting and guiding the electrode held in the electrode holder, an electrode guide holder adapted to be detachably attached to the electrode holder and having the electrode guide attached thereto, and electrode guide supporting means for supporting the electrode guide, the electrode guide supporting means having gripping means for gripping the electrode guide or the electrode guide holder and provided with moving means for moving the electrode guide or the electrode guide holder in parallel to an axis of the spindle.

In the machine according to the present invention, as described above, the electrode is held in advance in the electrode holder on which the electrode guide is then mounted so that the electrode is inserted into the inner hole of the electrode guide attached to the electrode holder and, after the electrode holder is mounted on the spindle, the electrode guide is moved to the distal end of the electrode by the electrode guide supporting means so that the electric discharge machining is carried out while the distal end of the electrode being supported by the electrode guide. The electrode guide is directly mounted on the clamping means provided at the distal end of the electrode holder, and the electrode guide supporting means is adapted to grip and move the electrode guide so that the electrode guide supports the distal end of the electrode. Either the spindle or the table may move as long as the spindle and the table are adapted to be movable relative to each other. Such a construction can eliminate a troublesome process of inserting the electrode into the inner hole of the electrode guide every time the electrode is exhausted due to the electric discharge machining and the electrode holder is replaced, whereby it is possible to assuredly and extremely easily carry out the replacement of the electrode holder in a short time. Also, the electrode guide may be attached to the electrode guide holder, which may be then detachably mounted on the electrode guide. In such a case, the electrode guide supporting means grips the electrode guide holder and moves it parallel to the axis of the spindle so that the electrode guide is moved to the distal end of the electrode to support it.

Also, there is provided an electric discharge machine in which the spindle is attached to a spindle head, so that the spindle can be moved in a direction along the axis of the spindle and rotated about the axis of the spindle as well as be positioned at a desired position. As described above, the spindle is adapted to be movable in the direction of the axis thereof and rotatable about the axis thereof as well as capable of being position controlled. Such a construction, in which a table having a heavy workpiece carried thereon is not movable while the spindle having the electrode attached thereto is movable, can make the moving part lighter in weight to stabilize the control operation of the electric discharge machining.

Further, there is provided an electric discharge machine in which the electrode holder has a flow path formed therein for introducing working fluid into a pipe electrode when the pipe electrode is held therein. When the working fluid is supplied to the flow path, the working fluid is introduced into the pipe electrode and ejected from the distal end of the pipe electrode onto the part to be machined by the electric discharge machining, whereby chips can be removed therefrom and the machining efficiency and accuracy can be improved.

Also, there is provided an electric discharge machine, in which the electrode guide holder supporting means is attached to a suitable position on the spindle head or a machine body and has gripping means for gripping the electrode guide holder, so that the electrode guide holder can be gripped by the gripping means to move parallel to the axis of the spindle and positioned at a desired position. As described above, the electrode guide holder supporting means is adapted to grip the electrode guide holder and move it parallel to the axis of the spindle, so that the electric discharge machining is carried out, while the distal end of the electrode being supported by the electrode guide, and the position of the electrode guide can be adjusted in accordance with the length of the electrode. Such a construction makes it possible to easily and assuredly carry out the operation of replacing the electrode holder. Further, as the position of the electrode guide is adjustable in accordance with the length of the electrode, it is possible to guide and support the electrode always in a stable manner when the electrode is exhausted.

Also, there is provided an electric discharge machine, which further includes electrode holder replacement means for transferring the electrode holder between the spindle and an electrode magazine for storing one or more electrode holders. As described above, a plurality of electrode holders, each having the electrode held therein in advance on which the electrode guide or the electrode guide holder is then mounted, are stored in the electrode magazine so that the replacement of the electrode holder between the spindle and the electrode magazine can be automatically carried out by the electrode holder replacement means. Such a construction eliminates a troublesome process of inserting the electrode into the inner hole of the electrode guide every time when the electrode holder is automatically replaced by the electrode holder replacement means, whereby it is possible to assuredly carry out the automatic replacement of the electrode holder and to carry out the electric discharge machining including multiple processes for a long period in an unattended manner.

Also, there is provided an electric discharge machine in which the electrode guide holder has a taper-shaped distal end opposed to the workpiece, on which the electrode guide is detachably mounted. As described above, the distal end of the electrode guide holder is formed in a taper shape such as an inverse conical shape, and the electrode guide is detachably mounted on the distal end by means of collet or others so as to be easily detached from the distal end. Such a construction reduces a possibility of the interference between a device for guiding and supporting the electrode and the workpiece to facilitate the access to the workpiece. The electrode guide can be replaced with an electrode guide having a suitable hole diameter, depending on a diameter of the used electrode. If the inner hole of the electrode guide is worn due to the long-term use, the electrode guide is replaced with a fresh one.

Also, there is provided an electric discharge machine which further includes an anti-vibration guide movable toward and away from a lengthwise middle portion of the electrode mounted on the spindle and capable of holding and guiding the electrode when moving toward the middle portion. In the case that the electrode holder holds a thin and long electrode, the anti-vibration guide can hold and guide the middle portion of the length of the electrode to prevent the electrode from vibrating or bending.

To achieve the above-mentioned object, according to a third aspect of the present invention, there is further provided a method for machining a workpiece in a desirable manner by applying electric discharge machining voltage between an electrode and the workpiece while feeding the electrode and the workpiece relative to each other to control a machining gap, which includes the steps of: (a) mounting an electrode guide or an electrode guide holder on an electrode holder having an electrode held therein in advance; (b) mounting the electrode holder on a-spindle manually or by electrode holder replacement means; (c) moving the electrode guide to a distal end or the electrode to support the electrode; and (d) moving the electrode and the workpiece relative to each other to position the electrode at a position of the workpiece to be machined and start the electric discharge machining.

As described above, according to this method, the electrode is held in the electrode holder in advance, on which the electrode guide or the electrode guide holder is then mounted, and after the electrode holder is mounted on the spindle, the electrode holder or the electrode guide holder is gripped by electrode guide supporting means or electrode guide holder supporting means and moved downward so that the electrode guide moves to the distal end of the electrode and supports the electrode, after which the electrode is positioned at a position of the workpiece to be machined by moving the electrode and the workpiece relative to each other and the electric discharge machining is started. Such a construction can eliminate a troublesome process of inserting the electrode into the inner hole of the electrode guide every time when the electrode is exhausted due to the electric discharge machining and the electrode holder is replaced, whereby it is possible to assuredly and easily carry out the replacement of the electrode holder and the working efficiency of the electric discharge machining is improved. Particularly, in the case that the fine hole is machined, it was a very difficult and time-consuming operation to automatically insert a thin electrode into the inner hole of the electrode guide. The method according to the present invention makes it possible to easily carry out such a operation to solve a problem.

According to a fourth aspect of the present invention, there is provided a method for machining a workpiece in a desirable manner by applying electric discharge machining voltage between an electrode and the workpiece while feeding the electrode and the workpiece relative to each other to control a machining gap, which includes the steps of: mounting on a spindle of an electric discharge machine the electrode or an electrode holder having the electrode held therein; inserting the electrode into an electrode guide or an electrode guide holder gripped by electrode guide supporting means for supporting the electrode guide movable parallel to an axis of the spindle so that a distal end of the electrode is supported by the electrode guide; moving the electrode and the workpiece relative to each other to position the electrode at a position on the workpiece to be machined; and applying electric discharge machining voltage between the electrode and the workpiece while feeding the electrode and the workpiece relative to each other to carry out the electric discharge machining on the workpiece.

After the electrode or the electrode holder having the electrode held therein is mounted on the spindle, the spindle or the electrode guide supporting means is moved parallel to the axis of the spindle, thereby to insert the electrode into the electrode guide gripped by the electrode guide supporting means positioned at a position closer to the distal end of the electrode. After the distal end of the electrode is supported in this way by the electrode guide, the electrode is positioned at a position on the workpiece to be machined, and the electric discharge machining of the workpiece is started by applying the electric discharge machining voltage between the electrode and the workpiece.

According to a fifth aspect of the present invention, there is provided a method for machining a workpiece in a desirable manner by applying an electric discharge machining voltage between an electrode and the workpiece while feeding the electrode and the workpiece relative to each other to control a machining gap, which includes the steps of: holding the electrode in an electrode holder; mounting an electrode guide holder on the electrode holder so that the electrode is inserted into an electrode guide of the electrode guide holder; accommodating the electrode holder in an electrode magazine of an electric discharge machine; taking out the electrode holder from the electrode magazine by electrode holder replacement means and mounting the electrode holder on a spindle of the electric discharge machine; releasing the mounting of the electrode guide holder on the electrode holder and moving the electrode guide holder parallel to an axis of the spindle so that a distal end of the electrode is supported by the electrode guide; moving the electrode and the workpiece relative to each other to position the electrode at a position on the workpiece to be machined; and applying an electric discharge machining voltage between the electrode and the workpiece while feeding the electrode and the workpiece relative to each other to carry out the electric discharge machining on the workpiece.

The electrode is held in the electrode holder and the electrode guide holder is mounted on the electrode holder so that the electrode is inserted into the electrode guide of the electrode guide holder. The electrode holders in this state are accommodated in the electrode magazine, and one of them is taken out from the electrode magazine by the electrode holder replacement means and mounted on the spindle. Thereafter, the electrode guide holder is gripped by moving the electrode guide holder supporting means parallel to the axis of the spindle. The mounting of the electrode guide holder on the electrode holder is released, and the electrode guide holder is moved by the electrode guide holder supporting means to the distal end of the electrode and stopped there. This enables the electrode guide to support the distal end of the electrode, and after the electrode is positioned at a position on the workpiece to be machined, the electric discharge machining is started.

BRIEF DESCRIPTION OF THE DRAWINGS

These and other objects, features and advantages of the present invention will be described in more detail below based on the preferred embodiments of the present invention with reference to the accompanying drawings, wherein.

Figure 2:
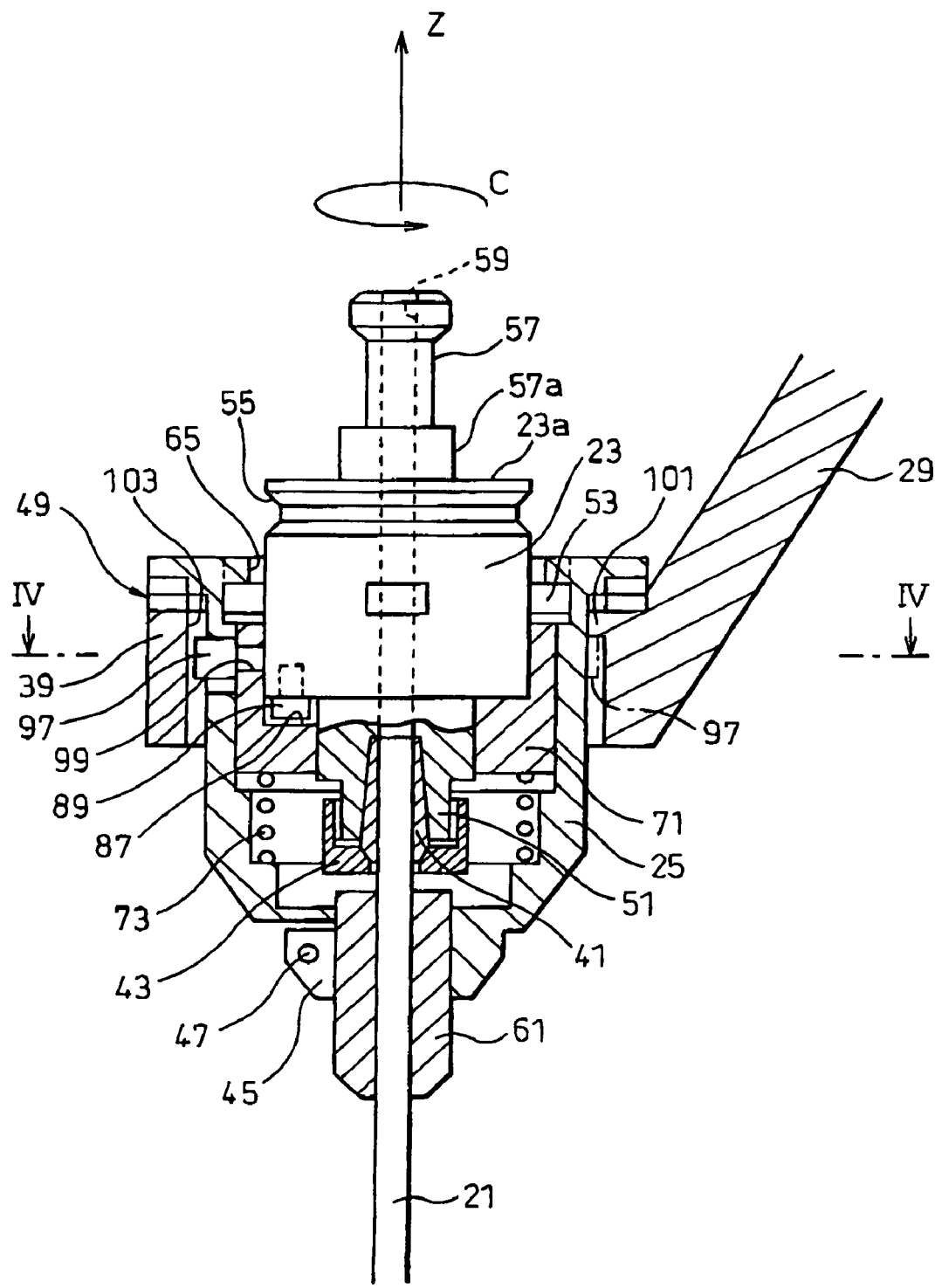
FIG. 2 is a sectional view of a first embodiment of the present invention illustrating an electrode holder on which an electrode guide holder is mounted.
Figure 6:
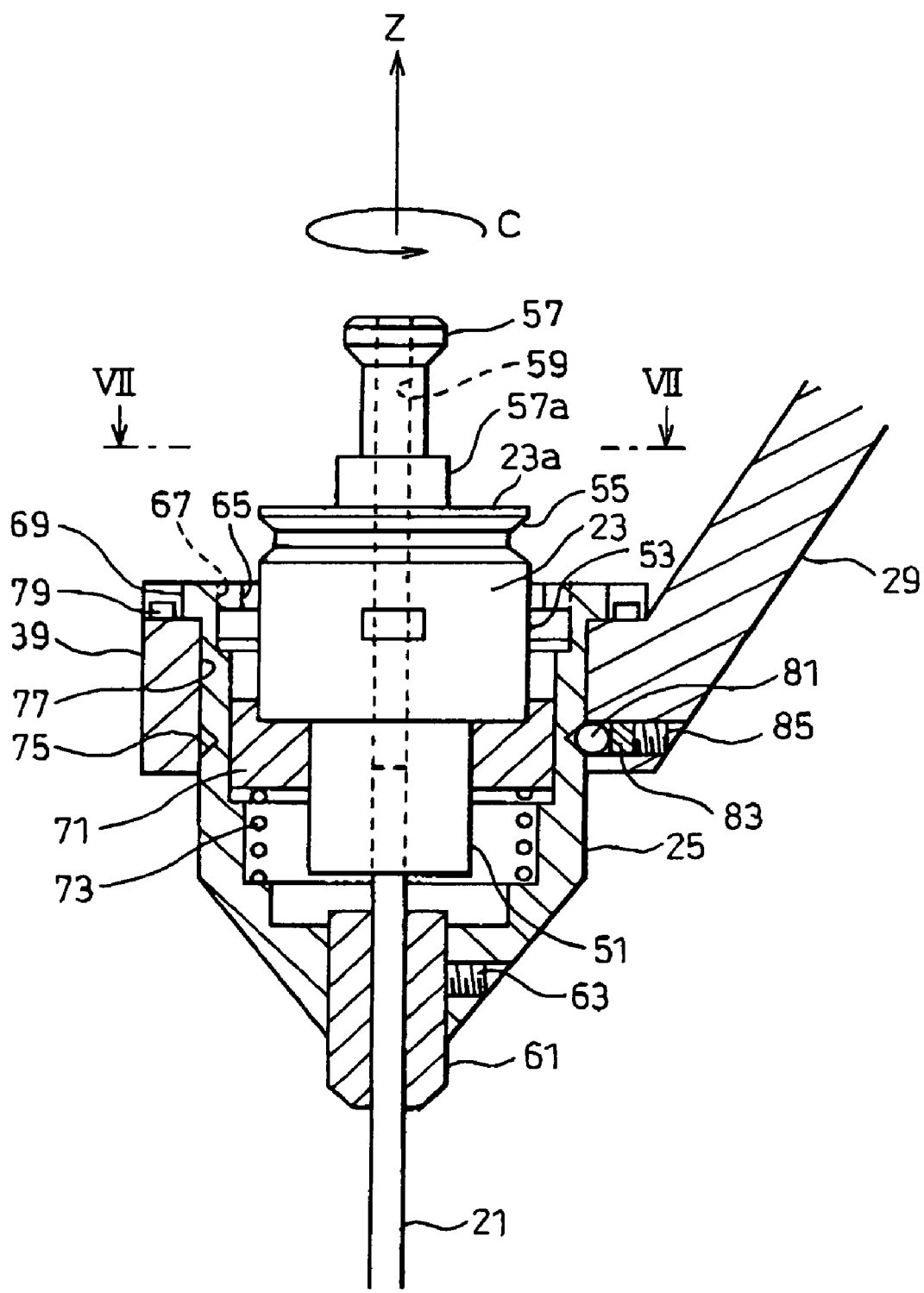
Figure 7:
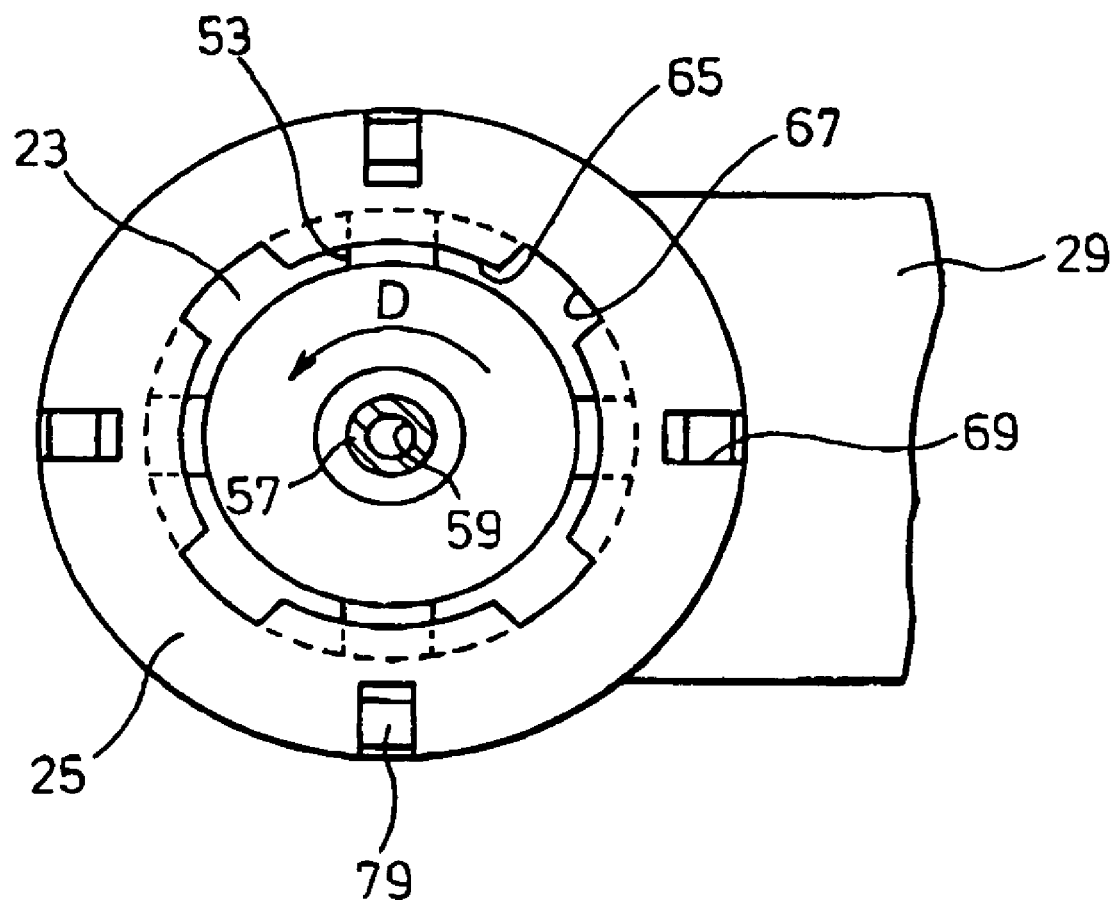

FIG, 4 is a sectional view taken along a line IV-IV in FIG. 2;

FIGS. 5A to 5E are views for illustrating the operations during the replacement of the electrode holder according to the present invention;

FIG. 6 is a sectional view of a second embodiment of the present invention illustrating an electrode holder on which an electrode guide holder is mounted; and FIG. 7 is a sectional view taken along a line VII-VII in FIG. 6.

BEST MODE FOR CARRYING OUT THE INVENTION

Embodiments of the present invention will be described below with reference to the drawings.

Figure 1:
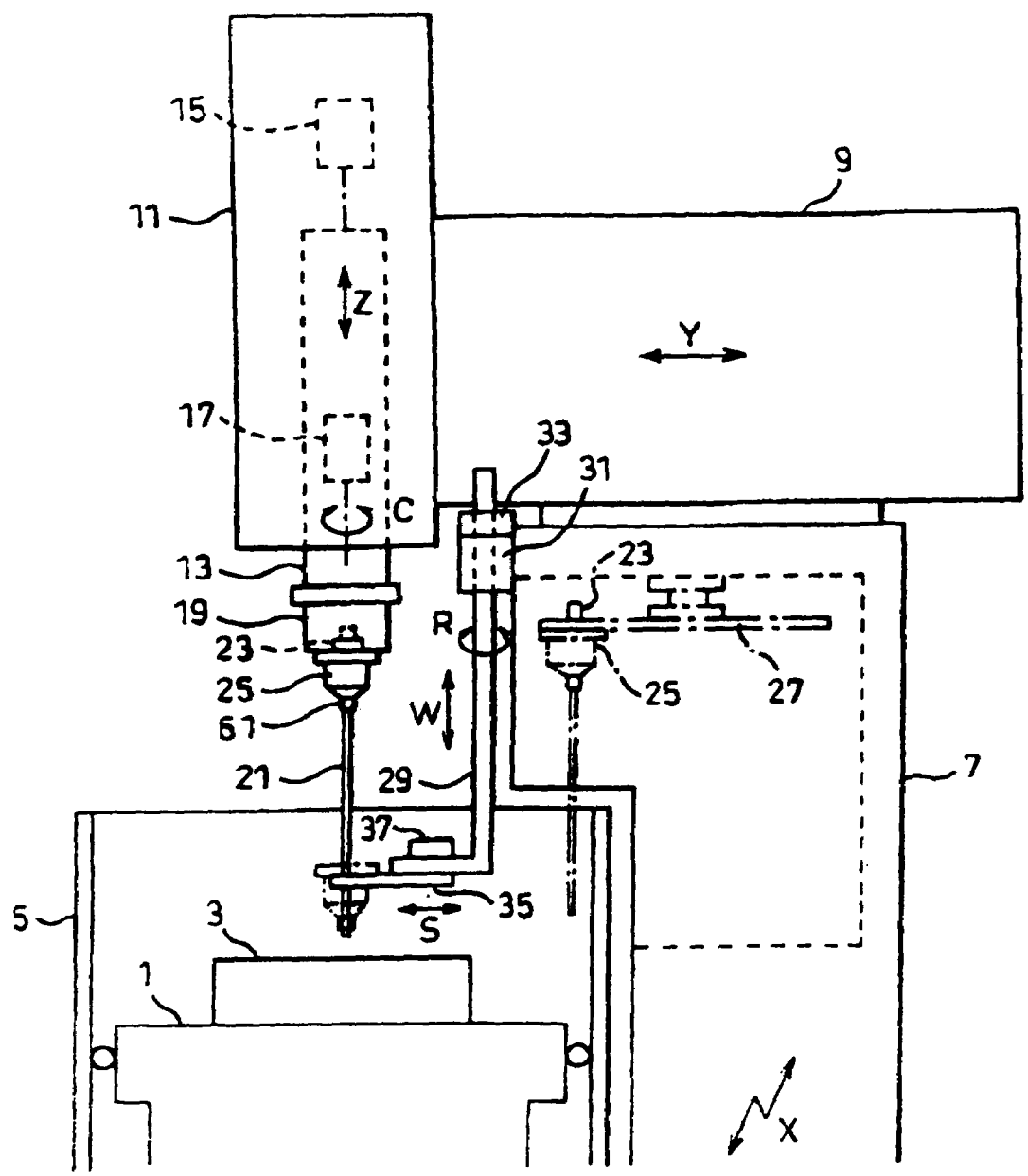
FIG. 1 is a side view illustrating an electric discharge machine according to an embodiment of the present invention.

In FIG. 1, a workpiece 3 is mounted on a table 1 provided on a base of an electric discharge machine not shown, and a work tank 5 for storing working fluid therein is provided so as to encircle the table 1 and the workpiece 3. A column 7 is provided on the base so as to be movable in a direction shown by an arrow X, and a ram 9 is provided on the column 7 so as to be movable in a direction shown by an arrow Y. A spindle head 11 is mounted on a front surface of the ram 9, and a spindle 13 is provided in the spindle head 11. The spindle 13 can be moved in a direction shown by an arrow Z, i.e. a direction parallel to an axis of the spindle 13, by a controller (not shown) activating a servo motor 15, and be positioned at any position. Also, the spindle 13 can be rotated about the axis of the spindle 13 as shown by an arrow C by the drive of a servo motor 17 and be positioned at any angular position. A known attachment means 19, such as a chuck commonly employed for detachably mounting an electrode holder 23 onto a distal end of the spindle 13, is provided.

A rod-like or a pipe-like electrode 21 used for machining a fine hole in the workpiece 3 is attached in advance to the electrode holder 23, which is then mounted on the spindle 13 with an electrode guide holder 25 mounted thereon. The electrode holder 23 with the electrode guide holder 25 mounted thereon is placed in an electrode magazine 27. An electrode guide holder supporting means 29 for supporting the electrode guide holder is attached to the column 7 via a bracket 31 and is adapted to be movable in a direction shown by an arrow W and to be capable of being positioned at any position. Further, the electrode guide holder supporting means 29 is rotatable as shown by an arrow R and is adapted to carry the electrode holder 23. The electrode guide holder supporting means 29 is provided at a distal end thereof with a gripper 35 for gripping the electrode holder 23 and/or the electrode guide holder 25, which is adapted to be driven by a drive device 37 to move in a direction shown by an arrow S when it is desired to grip or release the electrode guide holder 25. The gripper 35 is of a gripping claw type similar to those commonly employed in a tool exchanger for a machining center or others.

Figure 5:
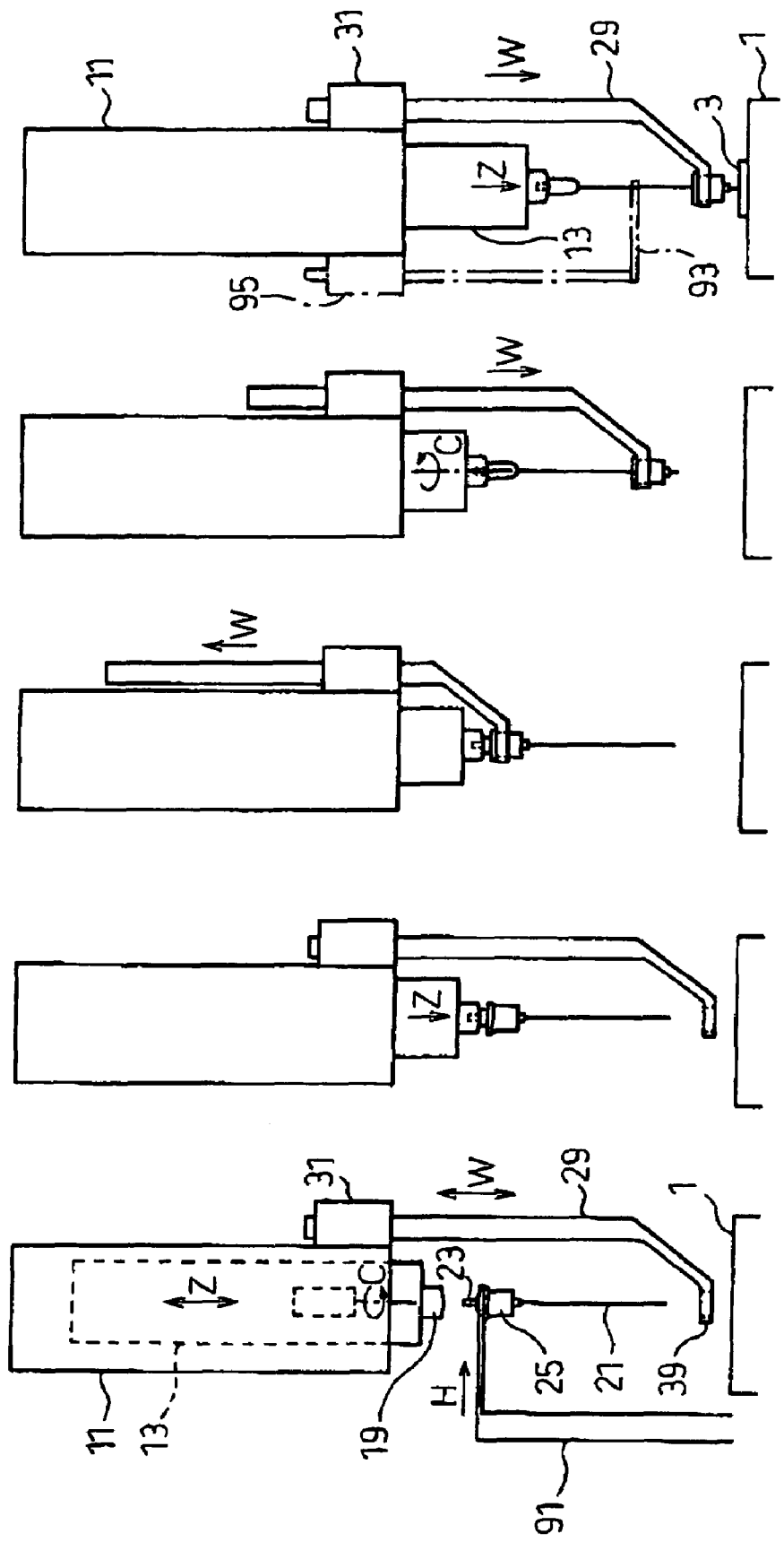

The electrode guide holder supporting means 29 grips the electrode holder 23 by the gripper 35 and transfers it to the spindle side by the rotation shown by the arrow R to mount the electrode holder 23 on the spindle 13. On the contrary, the electrode guide holder supporting means 29 grips the electrode holder 23 mounted on the spindle 13 by the gripper 35 and transfers it to the electrode magazine side by the rotation shown by the arrow R to place the electrode holder 23 in the electrode magazine 27. FIG. 1 is a view showing a state in which the electrode guide holder supporting means 29 grips the electrode guide holder 25 and moves it to a distal end of the electrode 21. In an alternative embodiment, electrode holder replacement means may be provided for exchanging the electrode holder 23 between the electrode magazine 27 and the spindle 13. This electrode holder replacement means is a device similar to the commonly employed known ones and, therefore, the explanation thereof will be omitted. FIG. 5A schematically illustrates an operation of an electrode holder replacement arm 91 of the electrode holder replacement means.

A system for exchanging the electrode holder 23 between the spindle 13 and the electrode magazine 23 may be a so-called armless exchanger system wherein the electrode holder 23 is directly transferred between the spindle 13 and the electrode magazine 23. In FIG. 1, after an empty mounting pocket of the electrode magazine 27 is indexed forward and the electrode magazine 27 is advanced as a whole in the Y-direction, the electrode holder 23 is held in the empty mounting pocket. After the spindle 13 is once retreated upward and another electrode holder 23 to be newly mounted on the spindle 13 is indexed in the electrode magazine 27, the spindle 13 is descended and the new electrode holder 23 is mounted on the spindle 13. Then, the electrode magazine 27 is retreated in the Y-direction, thereby to complete the automatic replacement of the electrode holder 23.

Figure 3:
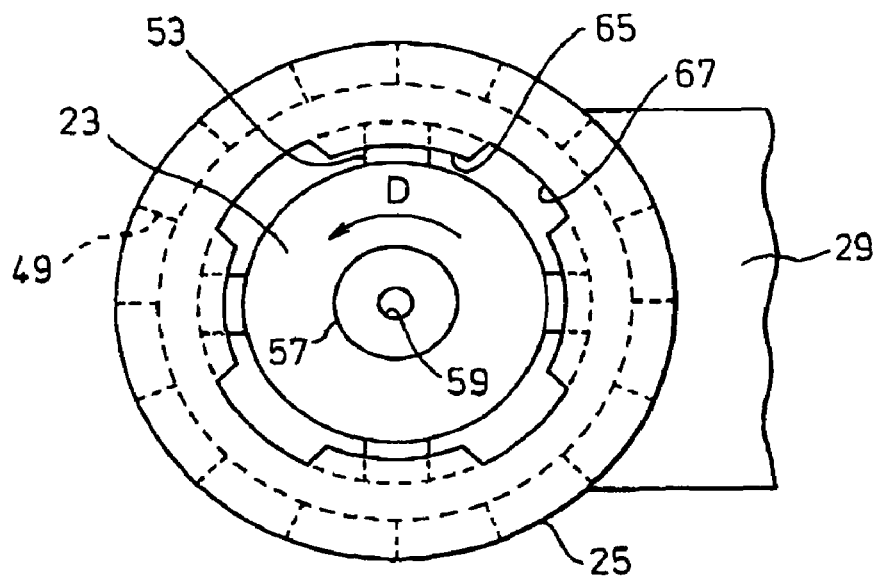
FIG. 3 is a top view of FIG. 2.
Figure 4:
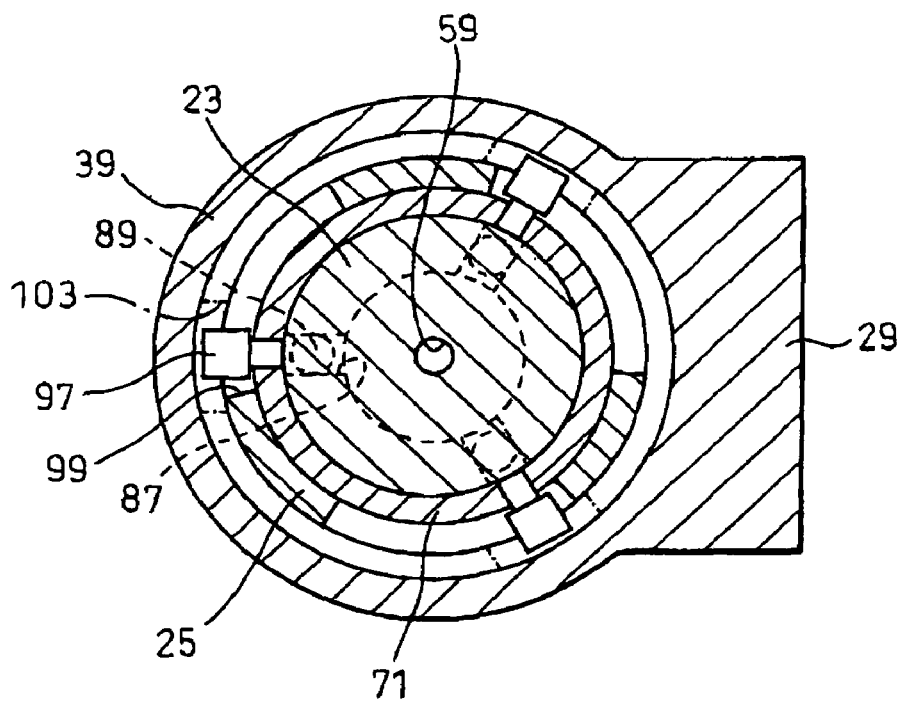

In FIGS. 2, 3 and 4, the electrode holder 23 includes an electrode holding section 51 for holding the electrode 21, four projections 53 for locking the electrode guide holder 25, a groove 55 for the electrode holder replacement arm 91 to grip the electrode holder 23, and a pull stud 57 for mounting the electrode holder 23 on the spindle 13. The pull stud 57, an outer circumference 57a of a mount seat of the pull stud 57, and a top surface 23a of the electrode holder 23 constitute an engagement portion with attachment means not shown. The pull stud 57 is pulled into the interior of the spindle 13 by a collet provided at a distal end of a draw bar biased with a spring force of a disc spring, thereby to mount the electrode holder 23 on the spindle 13. When the draw bar is moved forward against the spring force of the disc spring by an unclamp cylinder (not shown) provided behind the draw bar, the pull stud 57 is released to detach the electrode holder 23 from the spindle 13. The electrode 21 is detachably held in the electrode holding section 51 by means of a spring collet 41 and a nut 43 commonly employed in the art. A flow path 59 is formed through a center portion of the electrode holder 23 to allow a working fluid to pass therethrough when the pipe-like electrode is used for the machining.

The electrode guide holder 25 includes an electrode guide 61 removably fastened to a slotted portion 45 by a screw 47, projections 65 for engaging with the projections 53 of the electrode holder 23, recesses 67 formed between the projections, and a Curvic coupling 49 for positioning the electrode guide holder 25 with regard to a gripper section 39 of the electrode guide holder supporting means 29. A lower tip end of the electrode guide holder 25 is tapered, for example, to have an inverse conical shape for the purpose of avoiding interference with the workpiece 3. In FIG. 2, while slotting is used as means for fixing the electrode guide 61 at a distal end of the electrode guide holder 25, a collet or a known clamping means commonly employed in the prior art may be alternatively used for detachably mounting the electrode guide 61 on the distal end of the electrode guide holder 25. The electrode guide 61 is preferably made of hard and durable material such as sapphire or ceramic. In this regard, the electrode guide holder 25 may be integral with the electrode guide 61.

A pushing piece 71 and a spring 73 are provided in the electrode guide holder 25 for pushing the electrode holder 23 upward. As shown in FIGS. 2 and 4, there are three radially extending grooves 87 formed in the pushing piece 71, in which three pins 89 fixed to the electrode holder 23 are fitted respectively. Specifically, when the electrode holder 23 pushes the pushing piece 71 downward and is then rotated in the direction as shown by the arrow C, the pushing piece 71 is rotated along with the electrode holder 23. Further, three pins 97 are provided on the outer circumference of the pushing piece 71 to protrude radially through windows 99 formed in the electrode guide holder 25.

On the other hand, the gripper section 39 of the electrode guide holder supporting means 29 is of a ring shape which is different from the gripping claw type gripper 35 shown in FIG. 1. The gripper section 39 is formed with an annular projecting portion 101, which is notched by three grooves 103 at three sites in the circumferential direction. In a state wherein the electrode holder 23 having the electrode guide holder 25 mounted thereon is mounted on the spindle 13, when the electrode guide holder supporting means 29 moves upward in the direction shown by the arrow W, the Curvic couplings 49 are intermeshed with each other because the pins 97 are aligned with the grooves 103, and then, the upward motion of the electrode guide holder supporting means 29 is made to stop. Thereafter, the spindle 13 is lowered by a predetermined small distance in the Z-axis direction to push down the pushing piece 71, and then rotated by 45 degrees in a direction opposite the direction shown by the arrow D to rotate the electrode holder 23 along with the spindle 13. Next, when the spindle 13 is moved up by the above-mentioned predetermined small distance, the pins 97 are engaged with the projecting portion 101 by a pressing force of the spring 73, so that the electrode holder 25 is gripped by the gripper section 39. Simultaneously therewith, the electrode holder 23 is released from the electrode guide holder 25. The procedure for attachment/detachment of the electrode holder 23 and the electrode guide holder 25 will be described later.

The electrode 21 is manually held in advance in the electrode holding section 51 of the electrode holder 23, on which the electrode guide holder 25 is then mounted. Thereafter, a plurality of electrode holders 23, each having the electrode guide holder 25 mounted thereon, are placed in the electrode magazine 27. Thus, the preparation is completed. When the electrode guide holder 25 is mounted on the electrode holder 23, the projections 53 of the electrode holder 23 are aligned with the recesses 67 of the electrode guide holder 25, and inserted thereinto by lowering the pushing piece 71, after which the electrode holder 23 is rotated by 45 degrees in the direction shown by the arrow D whereby the projections 53 are engaged with the projections 65 by the pressing force of the spring 73 to mount the electrode guide holder 25 on the electrode holder 23. When the electrode guide holder 25 is detached from the electrode holder 23, the electrode holder 23 is slightly pushed down and rotated by 45 degrees in the direction opposite to the direction shown by the arrow D to disengage the projections 53 from the projections 65, after which the electrode guide holder 25 is moved down and removed from the electrode holder 23.

FIGS. 5A to 5E are views for illustrating the operations carried out for automatically replacing the electrode holder 23 by using electrode holder replacement means and starting the electric discharge machining. In FIG. 5A, the spindle 13 is movable in the direction shown by the arrow Z and rotatable in the direction shown by the arrow C with regard to the spindle head 11 provided above the table 1. The attachment means 19 for attaching or detaching the electrode holder 23 to or from the spindle 13 is provided at a distal end of the spindle 13. A gripper arm 29 having the gripper section 39 used as the electrode guide holder supporting means is attached to the spindle head 11 via the bracket 31. The gripper arm 29 can be moved and positioned in the direction shown by the arrow W by a drive device not shown, and the gripper section 39 is positioned beneath the electrode 21. The electrode holder replacement arm 91 in the electrode holder replacement means grips the electrode holder 23 having the electrode 21 and the electrode guide holder 25 mounted thereon, to pick it up from the electrode magazine 27 and position the electrode holder 23 beneath the spindle 13 by the movement of the arm 91 in the direction shown by an arrow H.

FIG. 5B illustrates a state wherein the spindle 13 is descended in the direction shown by the arrow Z, the attachment means 19 of the spindle 13 clamps the electrode holder 23, and the electrode holder replacement arm 91 is retreated to a retreated position. FIG. 5C illustrates a state wherein the gripper arm 29 is moved up in the direction shown by the arrow W and the gripper section 39 is intermeshed with the electrode guide holder 25 via the Curvic couplings 49. FIG. 5D illustrates a state wherein the spindle 13 is rotated by 45 degrees as shown by the arrow C so that the gripper section 39 grips the electrode guide holder 25 and the electrode holder 23 is disengaged from the electrode guide holder 25, after which the gripper arm 29 is descended in the direction shown by the arrow W while the gripper section 39 grips the electrode guide holder 25, thereby to move the electrode guide 61 to the distal end of the electrode 21.

FIG. 5E illustrates a state wherein the gripper arm 29 is descended in the direction shown by the arrow W in synchronism with the downward movement of the spindle 13 in the direction shown by the arrow Z and the electrode 21 is positioned to a machining position on the workpiece 3 to be machined. In this regard, the positioning of the electrode 21 relative to the workpiece 3 may, of course, be achieved by moving up the table 1 relative to the spindle which is stationary. When the fine hole is machined, the electrode 21 must be thin and long. Therefore, vibration and/or bending of the electrode may occur. To prevent such vibration and/or bending, a known anti-vibration guide 93 commonly employed in the prior art is attached to the spindle head 11 via a bracket 95. The anti-vibration guide 93 is movable forward and rearward by a drive device not shown. The anti-vibration guide 93 is not indispensable but desirable.

Next, an electrode guide holder 25 according to a second embodiment of the present invention will be described with reference to FIGS. 6 and 7. In FIGS. 6 and 7, the same elements as in the first embodiment are denoted by the same reference numerals.

An electrode guide 61 is detachably fastened to the electrode guide holder 25 by a set screw 63. The electrode guide 61 may be integral with the electrode guide holder 25. In such a case, the electrode guide holder 25 and the electrode guide 61 could be regarded as a single electrode guide as a whole. While an electrode fixing section 51 of an electrode holder 23 is not shown in detail in the drawings, it may be constituted by a spring collet and a nut as in the embodiment shown in FIG. 2 or may have a construction different therefrom.

In order to engage the electrode guide holder 25 with the electrode holder 23, projections 53 of the electrode holder 23 are aligned with recesses 67 of the electrode guide holder 25 to insert the electrode holder 23 into the electrode guide holder 25, a pushing piece 71 is pushed down against a pressing force of a spring 73 and then rotated by 45 degrees in the direction shown by the arrow D, and the pushing down of the pushing piece is stopped. Due to these steps, the pushing piece 71 is pushed up by the pressing force of the spring 73 to bring the projections 53 into contact with the projections 65 and engage the electrode guide holder 25 with the electrode holder 23. Steps reverse thereto disengage the electrode guide holder 25 from the electrode holder 23.

The positioning of the gripper section 39 of the electrode guide holder supporting means 29 relative to the electrode guide holder 25 is carried out by inserting the electrode guide holder 25 into an inner hole 77 of the gripper section 39 to fit projections 79 of the gripper section 39 in four grooves 69 of the electrode guide holder 25. At the same time, a plurality of balls 81 biased by elastic members 83 and set screws 85 move into grooves 75 formed in the electrode guide holder 25, thereby to grip the electrode guide holder 25 in the electrode guide holder supporting means 29. If the electrode holder 23 and the electrode guide holder 25 according to the second embodiment are used, the steps for the replacement of the electrode holder shown in FIGS. 5A to 5E are the same as in the first embodiment.

Although not shown, in one arrangement, a clamp means such as a collet or the like may be provided at a distal end of the electrode holding section 51 so that the electrode guide 61 for inserting the electrode 21 thereinto can be detachably mounted on the clamp means. Electrode guide supporting means having a gripper section for gripping the electrode guide 61 may be adapted to directly grip the electrode guide 61 by the gripper section to move it parallel to an axis of the spindle 13 so that the electric discharge machining can be carried out while a distal end of the electrode 21 is supported by the electrode guide 61.

In the case that the electrode guide holder 25 shown in FIG. 6 is used, a gripper member of the electrode guide holder supporting means 29 can grip the electrode guide holder 25 mounted on the electrode holder 23 clamped in the electrode magazine 27, and laterally pulls the electrode guide holder 25 out of the electrode magazine 27 for the purpose of transfer. Also, as shown in FIG. 5A, if an electrode holder replacement arm 91 used only for replacing the electrode is provided separately from the electrode guide holder supporting means 29, it is possible to smoothly carry out the electrode replacement even if a distance between the electrode magazine 27 and the spindle 13 is long and/or the electrode holder 23 is heavy.

While this embodiment has been described based on the case in which rod-like or pipe-like electrode is used for machining a fine hole, the same apparatus and method are also applicable to a thin-plate-type of long electrode. Further, while the electrode 21 is mounted on the spindle 13 by using the electrode holder 23 in this embodiment, it is also possible to directly mount the electrode on the spindle by the attachment means 19 of the spindle 13. In such a case, the attachment means 19 includes a chuck structure capable of gripping either of the electrode and the electrode holder. Irrespective of using the electrode holder or not, after mounting the electrode on the spindle, the electrode guide or the electrode guide holder and the electrode may be moved relative to each other in the direction shown by the arrow Z to insert the electrode into the electrode guide and support a distal end of the electrode by the electrode guide supporting means or the electrode guide holder supporting means. Thereby, when a plurality of electrodes of the same diameter are used for machining fine holes, there is no need for preparing the same number of electrode guide holders as that of the electrodes, which is economical.

As described hereinbefore, according to the present invention, the electrode is held in advance in the electrode holder, on which the electrode guide holder is mounted, with the electric guide inserted into the electric holder. After the electric holder is then mounted on the spindle, the electrode guide or the electrode guide holder is moved to the distal end of the electrode so that the distal end of the electrode is supported by the electrode guide. Therefore, a troublesome process of inserting the electrode into the inner hole of the electrode guide every time when the electrode holder is replaced can be eliminated, which makes it possible to assuredly carry out the replacement of the electrode holder and results in the improved machining efficiency. Also, as the electrode holder replacement means is further added, it is possible to assuredly carry out the automatic replacement of the electrode holder to realize automatic multi-process electric discharge machining for a long period. Further, since the distal end of the electrode guide holder is formed in an inverse conical shape and the electrode guide is attached thereto, the possibility of interference of the workpiece with the apparatus is reduced, thereby to improve the accessibility to the workpiece.

As the electrode guide supporting means and the electrode guide holder supporting means can be positioned at any position, it is possible to adjust the position of the electrode guide depending on a length of the electrode when the electrode is exhausted and becomes shorter, so that the electrode is always guided and supported in a stable state. A working fluid introduced into a center hole of the pipe-like electrode through a flow path formed in the electrode holder is ejected from the distal end of the pipe-like electrode, which facilitates the discharge of chip generated during the machining of the fine hole to improve the machining accuracy and the machining efficiency. Further, as the electrode guide is detachably mounted on the electrode guide holder, it is possible to easily replace the electrode guide in a short time. Provision of the anti-vibration guide makes it possible to hold and guide a middle portion of the thin and long electrode, thereby to avoid the vibration or bending of the electrode and achieve a high precision machining of a fine hole or a thin slit. The above-mentioned method makes it possible to eliminate a troublesome process of inserting the electrode into the inner hole of the electrode guide every time when the electrode holder is replaced, thereby to assuredly carry out the operation for the replacement of the electrode and improve the operating efficiency of the electric discharge machining.

What is claimed is:

1. An electric discharge machine having an electrode for machining a workpiece by applying electric discharge machining voltage between said electrode and said workpiece while feeding said electrode and said workpiece relative to each other to control a machining gap, said electric discharge machine comprising:

a spindle and an electrode holder for carrying said electrode, said spindle being provided with attachment means for detachably attaching said electrode holder to said spindle; said electrode holder having an engagement portion for engaging with said attachment means of said spindle, wherein said electrode holder is provided with an electrode holding means for holding said electrode in said electrode holder;

an electrode guide holder including an engagement portion for detachably engaging with said electrode holder, said electrode guide holder having attached thereto an electrode guide for supporting and guiding said electrode; and electrode guide holder supporting means for supporting said electrode guide holder for causing said electrode guide holder to selectively disengage from said electrode holder and for moving said electrode guide holder along said electrode to the distal thereof so that said electrode guide attached to said electrode guide holder supports said distal end of said electrode, said electrode guide holder supporting means having gripping means for gripping said electrode guide holder and being provided with moving means for moving said electrode guide holder.

2. The electric discharge machine according to claim 1, wherein said electrode guide holder supporting means is attached to a suitable position on said spindle head or a machine body and has gripping means for gripping said electrode guide holder, so that the electrode guide holder can be gripped by said gripping means to move parallel to the axis of said spindle and positioned at a desired position.

3. An electric discharge machine including an electrode for machining a workpiece by applying electric discharge machining voltage between a said electrode and said workpiece while feeding said electrode and said workpiece relative to each other to control a machining gap, said electric discharge machine comprising:

a spindle and an electrode holder, said spindle being provided with attachment means for detachably attaching said electrode or said electrode holder to said spindle;

said electrode holder having an engagement portion for engaging with said spindle attachment means and being provided with electrode gripping means for fixing the position of said electrode in said electrode holder;

an electrode guide for supporting and guiding said electrode held in said electrode holder;

an electrode guide holder adapted to be detachably attached to said electrode holder and having said electrode guide attached thereto, said electrode guide remaining supporting and guiding said electrode after said detachment from electrode holder; and electrode guide supporting means for supporting said electrode guide, said electrode guide supporting means having gripping means for gripping said electrode guide or said electrode guide holder and provided with moving means for moving said electrode guide or said electrode guide holder in parallel to an axis of said spindle.

4. The electric discharge machine according to claim 1 or 3, wherein said spindle is attached to a spindle head, so that said spindle can be moved in a direction along the axis of said spindle and rotated about the axis of said spindle as well as be positioned at a desired position.

5. The electric discharge machine according to claim 1 or 3, wherein said electrode holder has a flow path formed therein for introducing working fluid into a pipe electrode when said pipe electrode is held therein.

6. The electric discharge machine according to claim 1 or 3, further comprising electrode holder replacement means for transferring said electrode holder between said spindle and an electrode magazine for storing one or more electrode holders.

7. The electric discharge machine according to claim 1 or 3, wherein said electrode guide holder has a tapered-shaped distal end opposed to said workpiece, on which said electrode guide is detachably mounted.

8. The electric discharge machine according to claim 1 or 3, further comprising an anti-vibration guide movable toward and away from a lengthwise middle portion of said electrode mounted on said spindle and capable of holding and guiding said electrode.

9. A method for machining a workpiece in a electric discharge machine by applying electric discharge machining voltage between an electrode and said workpiece while feeding said electrode and said workpiece relative to each other to control a machining gap, said electric discharge machine comprising a spindle provided with attachment means for detachably attaching an electrode holder to said spindle, said electrode holder having an engagement portion for engaging with said attachment means of said spindle and provided with electrode holding means for holding said electrode in said electrode holder, an electrode guide holder including an engagement portion for engaging with said electrode holder and having attached thereto an electrode guide for supporting and guiding said electrode, and electrode guide holder supporting means for supporting said electrode guide holder so that said electrode guide supports a distal end of said electrode, said electrode guide holder supporting means having gripping means for gripping said electrode guide holder and provided with moving means for moving said electrode guide holder in parallel to an axis of said spindle, said method comprising the steps of:
(a) mounting said electrode guide holder on said electrode holder having an electrode held therein in advance;
(b) mounting said electrode holder with said mounted electrode guide holder onto said spindle manually or by electrode holder replacement means;
(c) gripping said electrode guide holder by said electrode guide holder supporting means and moving said electrode guide holder apart from said spindle mounted electrode holder to said distal end of said electrode to support said electrode with said electrode guide; and
(d) moving said electrode and said workpiece relative to each other to position said electrode at a position on said workpiece to be machined and start the electric discharge machining.

10. A method for machining a workpiece in an electric discharge machine by applying electric discharge machining voltage between an electrode and said workpiece, said electric discharge machine having a spindle provided with attachment means, an electrode holder provided with electrode holding means for holding said electrode, an electrode guide holder for engaging with said electrode holder and having an electrode guide for supporting and guiding said electrode, and electrode guide holder supporting means for supporting said electrode guide holder and having gripping means for gripping said electrode guide holder, said method comprising the steps of;
mounting on said spindle said electrode or said electrode holder having said electrode held therein and said electrode guide holder mounted thereabout;
positioning said electrode guide holder at the distal end of said electrode by inserting said electrode into said electrode guide or by gripping said electrode guide holder by said electrode guide supporting means and moving it so that a distal end of said electrode is supported by said electrode guide;
moving said electrode and said workpiece relative to each other to position said electrode at a position on said workpiece to be machined; and
applying electric discharge machining voltage between said electrode and said workpiece while feeding said electrode and said workpiece relative to each other to carry out the electric discharge machining on said workpiece.

11. A method for machining a workpiece in an electric discharge machine, said electric discharge machine having an electrode, a spindle provided with an attachment member an electrode holder having an engagement portion, an electrode guide holder having an engagement portion and an electrode guide for supporting and guiding said electrode, electrode guide holder supporting means for supporting said electrode guide holder and having gripping means for gripping said electrode guide holder, being also provided with moving means for moving said electrode guide holder, and electrode holder replacement means for transferring said electrode holder with an electrode held thereby between said spindle and an electrode magazine, said method comprising the steps of:
holding said electrode in said electrode holder;

mounting said electrode guide holder on said electrode holder so that said electrode is inserted into said electrode guide of said electrode guide holder;

accommodating said electrode holder in said electrode magazine;

taking out said electrode holder from said electrode magazine by said electrode holder replacement means and mounting said electrode holder with said electrode and said electrode guide holder onto said spindle;

releasing the mounting of said electrode guide holder on said electrode holder and moving said electrode guide holder parallel to an axis of said spindle by said electrode guide holder supporting means so that said distal end of said electrode is supported by said electrode guide;

moving said electrode and said workpiece relative to each other to position said electrode at a position on said workpiece to be machined; and applying electric discharge machining voltage between said electrode and said workpiece while feeding said electrode and said workpiece relative to each other to carry out the electric discharge machining on said workpiece.

\* \* \* \* \*